United States Patent
Wang

(10) Patent No.: US 12,361,901 B2
(45) Date of Patent: Jul. 15, 2025

(54) ANTI-LOST DEVICE BASED ON AN ELECTRONIC INK SCREEN

(71) Applicant: Haiqi Wang, Shenzhen (CN)

(72) Inventor: Haiqi Wang, Shenzhen (CN)

(*) Notice: Subject to any disclaimer, the term of this patent is extended or adjusted under 35 U.S.C. 154(b) by 0 days.

(21) Appl. No.: 18/822,420

(22) Filed: Sep. 2, 2024

(65) Prior Publication Data

US 2024/0420654 A1 Dec. 19, 2024

(30) Foreign Application Priority Data

Jul. 24, 2024 (CN) .......................... 202421769829.3

(51) Int. Cl.
*G09G 3/34* (2006.01)
*G06F 3/02* (2006.01)
(Continued)

(52) U.S. Cl.
CPC .............. *G09G 3/3433* (2013.01); *G06F 3/02* (2013.01); *G06K 19/06037* (2013.01);
(Continued)

(58) Field of Classification Search
CPC .... G09G 3/3433; G09G 2354/00; G06F 3/02; G06K 19/06037; G06K 19/06112; G08B 21/24; H04W 4/80
(Continued)

(56) References Cited

U.S. PATENT DOCUMENTS

2014/0253466 A1* 9/2014 Brewer ................... G06F 21/88
345/173
2015/0227925 A1* 8/2015 Filler ....................... H04L 9/00
382/100
(Continued)

FOREIGN PATENT DOCUMENTS

| CN | 106228746 A | 12/2016 |
| CN | 207182641 U | 4/2018 |
| CN | 214427767 U | 10/2021 |

OTHER PUBLICATIONS

Fu Jiajia Wearable anti-lost device and anti-lost method Dec. 14, 2016 Hangzhou H3C Tech Co Ltd CN106228746 (A) paras. 1-90 Figs. 1-3 English.*
(Continued)

*Primary Examiner* — Prabodh M Dharia
(74) *Attorney, Agent, or Firm* — S.J. Intellectual Property LTD.

(57) ABSTRACT

An anti-lost device based on an electronic ink screen is provided, the anti-lost device based on the electronic ink screen comprises a button, a circuit board and an electronic ink screen; the circuit board includes an ink-screen driving Bluetooth sensor and a find my Bluetooth sensor; when the anti-lost device is lost, a APP of a mobile phone sends a lost signal to the circuit board, the Find my bluetooth sensor sends the location information to the APP, when the button is pressed several times, the electronic ink screen driving Bluetooth sensor controls the electronic ink screen to display a preset contact information or a QR code of the preset contact information. The anti-lost device is low power consumption, multi-function display and convenient operation, and can be widely used in multiple scenarios, and can better meet the needs of users.

7 Claims, 3 Drawing Sheets

(51) Int. Cl.
    *G06K 19/06*          (2006.01)
    *G08B 21/24*          (2006.01)
    *H04W 4/80*          (2018.01)

(52) U.S. Cl.
    CPC ........ *G06K 19/06112* (2013.01); *G08B 21/24* (2013.01); *G09G 2354/00* (2013.01); *H04W 4/80* (2018.02)

(58) Field of Classification Search
    USPC ................... 345/184, 173; 382/100; 235/492
    See application file for complete search history.

(56) References Cited

U.S. PATENT DOCUMENTS

2017/0111510 A1*   4/2017   Cardona ................. H04W 4/02
2017/0344959 A1*  11/2017   Bostick ................ H04W 4/021
2021/0327552 A1*  10/2021   Jones ................... G06K 19/041
2023/0316031 A1*  10/2023   Chen .................. G06K 19/0707
                                                      235/492

OTHER PUBLICATIONS

Fu Jiajia Wearable anti-lost device and anti-lost method Dec. 14, 2016 Hangzhou H3C Tech Co Ltd CN106228746 (A) paras. 1-90 Figs. 1-3 Chinese.*
Shao Gangming Anti-lost application pen Dec. 22, 2020 Shao Gangming Dec. 22, 2020 CN112109474 (A) 1-35, Figs. 1-3 English.*
Shao Gangming Anti-lost application pen Dec. 22, 2020 Shao Gangming Dec. 22, 2020 CN112109474 (A) 1-35, Figs. 1-3 Chinese.*

* cited by examiner

ANTI-LOST DEVICE BASED ON AN ELECTRONIC INK SCREEN

CROSS-REFERENCE TO RELATED APPLICATIONS

This application claims foreign priority of Chinese Patent Application No. 202421769829.3, filed on Jul. 24, 2024 in the China National Intellectual Property Administration, the disclosures of all of which are hereby incorporated by reference.

TECHNICAL FIELD

The present disclosure relates to the technical field of anti-lost device, in particular to an anti-lost device based on an electronic ink screen.

BACKGROUND

The existing anti-lost devices mainly include the following types:
1. find my device: the find my device is connected to the mobile phone through Bluetooth to realize the positioning and anti-lost alarm functions; and
2. anti-lost device: functions include audible alarm and APP positioning; and
3. locator and tracker: the positioning function is achieved through GPS or Bluetooth technology;
4. anti-theft label: the anti-theft label is configured for anti-theft and tracking of items.

However, the existing anti-lost devices can usually provide a single function, lack versatility, and can only display limited information, and there are insufficient aspects on display information and ease use, and the user experience also needs to be improved.

SUMMARY

The present disclosure provides an anti-lost device based on an electronic ink screen, which is low power consumption, multifunctional display, and convenient operation, and is can better meet the needs of users.

To realize the above objective, the present disclosure provides an anti-lost device based on an electronic ink screen, including: the anti-lost device based on the electronic ink screen comprises a button, a circuit board and an electronic ink screen; the button and the electronic ink screen are connected to the circuit board; the circuit board includes an ink-screen driving Bluetooth sensor and a find my Bluetooth sensor; when the anti-lost device based on the electronic ink screen is lost, a computer application program (APP) of a mobile phone sends a lost signal to the circuit board, the find my Bluetooth sensor sends the location information to the APP, when the button is pressed several times, the electronic ink screen driving Bluetooth sensor controls the electronic ink screen to display a preset contact information or a quick response (QR) code of the preset contact information.

Furthermore, the anti-lost device based on the electronic ink screen further comprises a beep piece connected to the circuit board, and the find my Bluetooth sensor controls the beep piece to emit an audible alarm when receiving a lost signal.

Furthermore, the anti-lost device based on the electronic ink screen further comprises a housing; the housing comprises a housing frame, a screen cover and a housing rear cover, and the housing frame is connected with the screen cover and the housing rear cover.

Furthermore, the screen cover is covered on the electronic ink screen, and the electronic ink screen driving Bluetooth sensor controls the electronic ink screen to display a preset pattern or text when the device is dormant.

Furthermore, the button is located on the housing rear cover, and when the key is pressed once, the electronic ink screen driving Bluetooth sensor receives a to be changed pattern or a to be changed text from the APP of the mobile phone, and transmits the to be changed pattern or a to be changed text to the electronic ink screen for display.

Furthermore, the anti-lost device based on the electronic ink screen further comprises a battery; the battery is connected to the circuit board, and the battery is configured to supply powers to the anti-lost device based on the electronic ink screen. Furthermore, the battery is a button battery.

Comparing with the existing anti-lost devices, the anti-lost device based on the electronic ink screen of the present disclosure has the following advantages:
1. low power consumption: the electronic ink screen has extremely low power consumption and can maintain display content for a long time; and
2. multi functional: the device integrates multiple functions such as anti-loss, positioning, and information display; and
3. convenient operation: the users can change the to be changed pattern or the to be changed text, or display the to be changed pattern or the to be changed text through simple button operation; and
4. widely applicable: it can be used in multiple scenarios to meet the needs of different users.

DETAILED DESCRIPTION OF THE EMBODIMENTS

Figure 1:
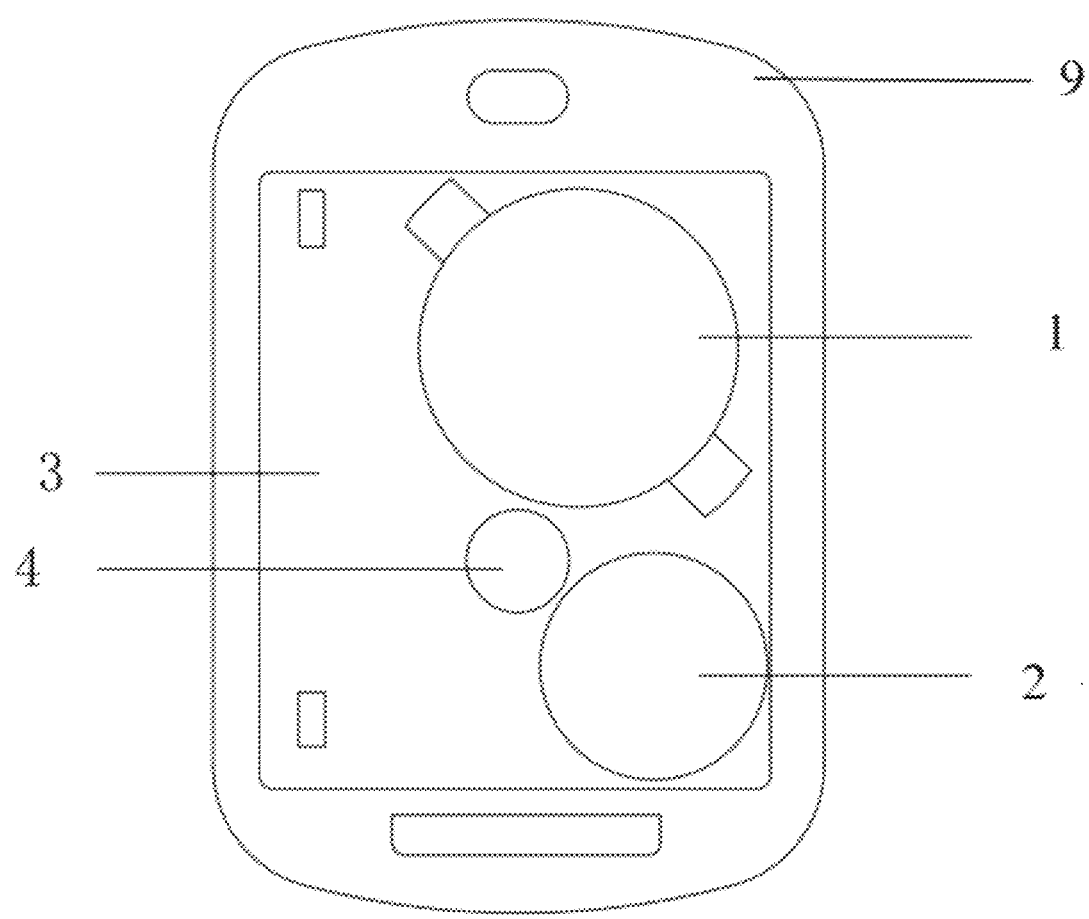
FIG. 1 is an internal schematic structural diagram of an anti-lost device based on an electronic ink screen according to an embodiment of the present disclosure.

It should be noted that the following detailed descriptions are exemplary and are intended to provide a further description of the present disclosure. Unless otherwise specified, all technical and scientific terms used herein have the same meaning as commonly understood by one of ordinary skill in the art to which this invention belongs.

It should be noted that the terminology used herein is for the purpose of describing particular embodiments only and is not intended to limit the exemplary embodiments according to the present disclosure. As used herein, the singular forms are intended to include the plural forms as well, unless the context clearly indicates otherwise, and it is also to be understood that when the terms "include" and/or "compose" are used in this specification, they indicate the presence of features, steps, operations, and/or combinations thereof.

The present embodiment provides an anti-lost device based on an electronic ink screen, the anti-lost device based on the electronic ink screen mainly includes:

- an electronic ink screen: configured to display a preset pattern or a preset text, and can still maintain the display the preset pattern or the preset text in conditions of low consumption and no power; and
- a Bluetooth sensor: the Bluetooth sensor is connected to an APP of a mobile phone through Bluetooth technology, to realize the replacement and positioning function of the preset pattern or the preset text; and
- a button: configured to wake up the anti-lost device, trigger the replacement of display the preset pattern or the preset text, and display the preset pattern or the preset text, and display a to be changed pattern or a to be changed preset text, and display a preset contact information or a quick response (QR) code of the preset contact information; and
- a battery: to supply an electric power required, and is designed in a low-power consumption; and
- a beep piece: configured to emit sound alarm.

The anti-lost device based on the electronic ink screen of this embodiment is applied in the following conditions:

1. normal use conditions: when the anti-lost device based on the electronic ink screen is in a dormant standby state, the electronic ink screen displays the preset pattern or the preset text; if the button is pressed once and the anti-lost device based on the electronic ink screen wakes up, leading the anti-lost device based on the electronic ink screen connects to the APP of mobile phone through Bluetooth and change the pattern or text; and
2. in lost case: after being picked up by other people, press the button to wake up the sensor, and then short press the button for three times continuously, and the anti-lost device based on the electronic ink screen will display the user's preset contact information (such as name, telephone number, social media account number or email address), or display the QR code generated by the user's preset contact information.

The anti-lost device based on the electronic ink screen can be widely used in the following scenarios:

1. find my device, anti-lost devices, locators, trackers, anti-theft labels: configured for positioning and anti-lost alarm; find my is an application launched by Apple that can help find lost items; and
2. key ring, key label, key ring hanging: can be used as a key ring, key label, key ring hanging, to achieve an anti-loss function and to identify the key; and
3. pet plate, pet collar, pet pendant: can be used as a pet plate, a pet collar, a pet pendant for the loss and logo of pets; and
4. wallet, bank card bag, business card box: the anti-lost device based on the electronic ink screen can be combined with a wallet, or a bank card bag, or a business card box, for the loss and logo of those items.

Figure 2:
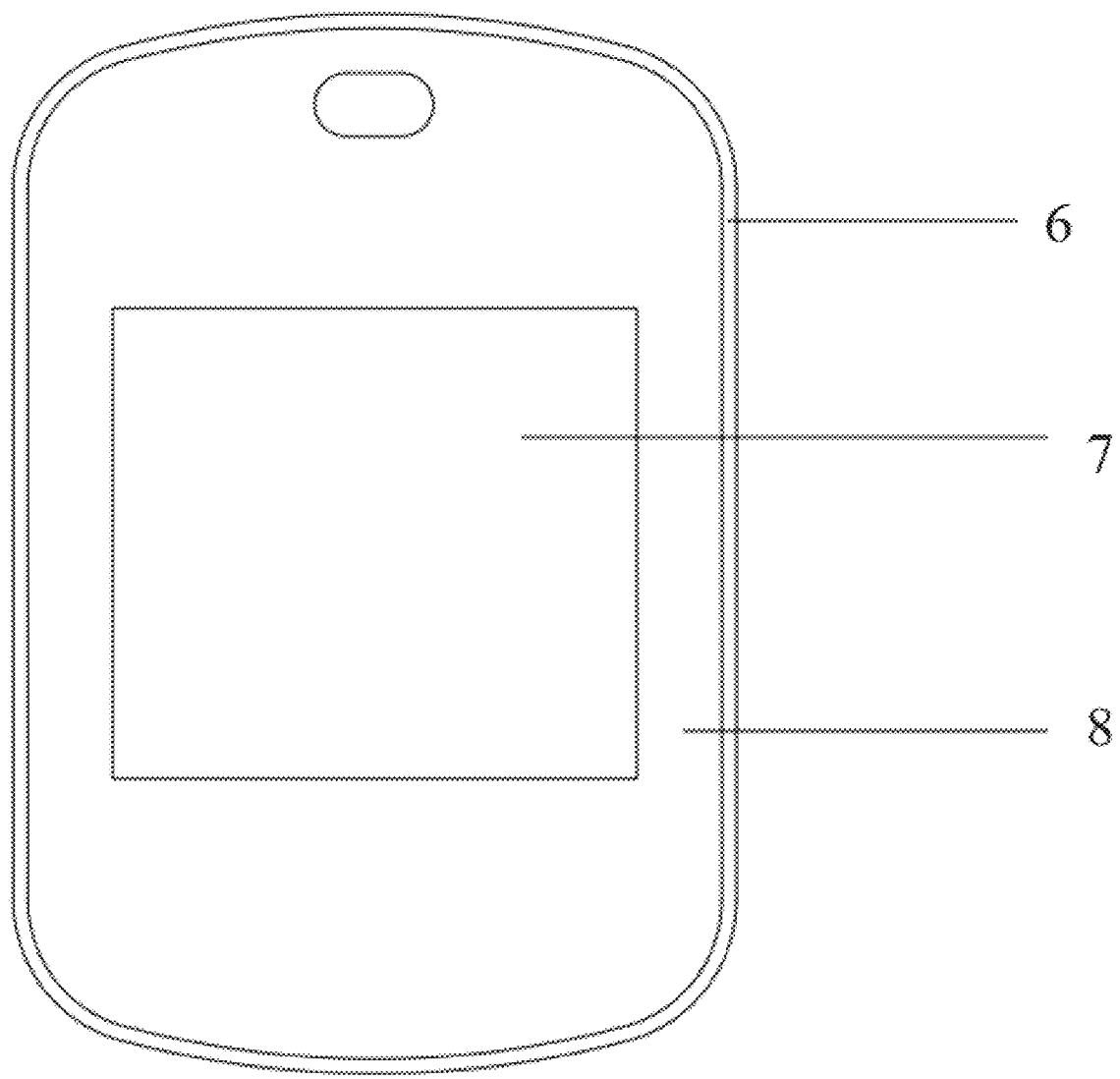
FIG. 2 is a schematic structural diagram of the anti-lost device based on an electronic ink screen according to an embodiment of the present disclosure.
Figure 3:
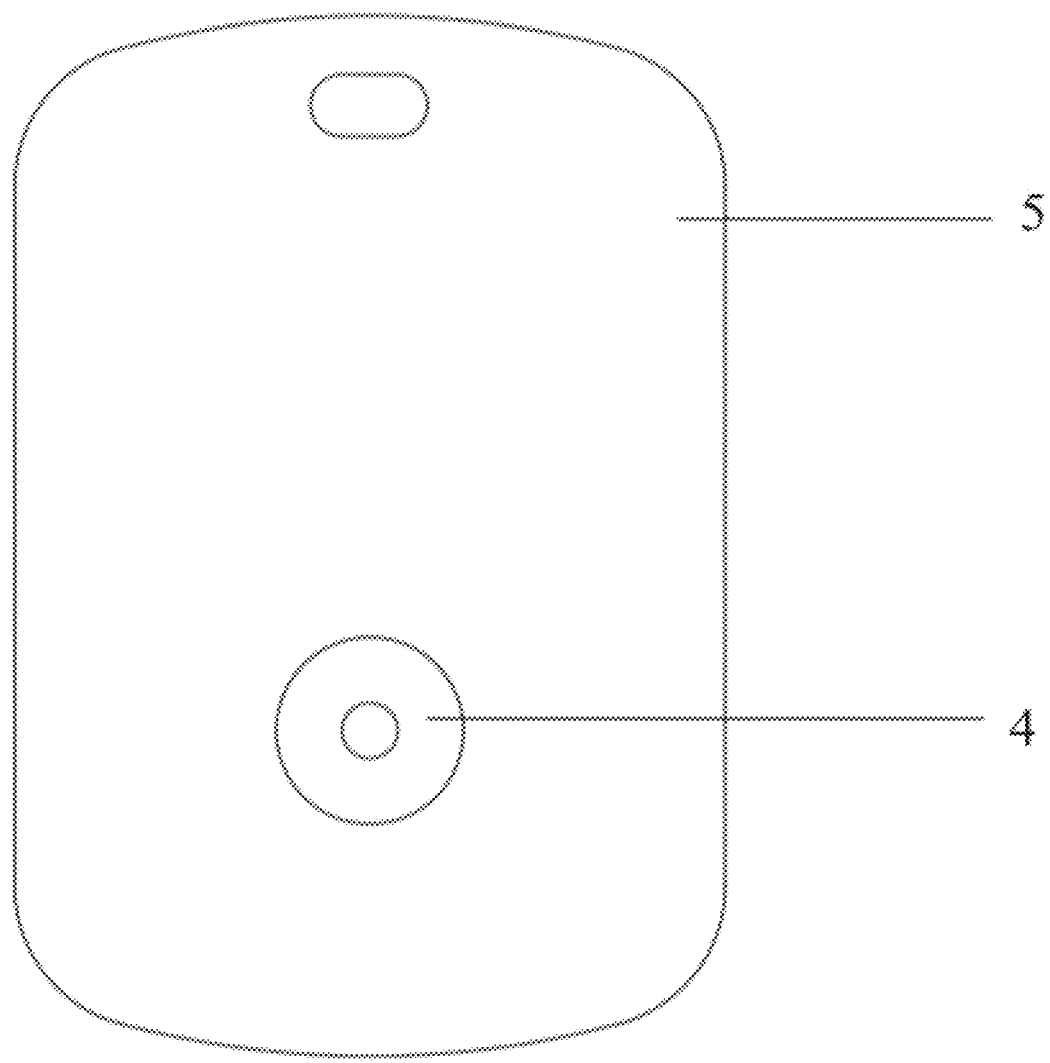
FIG. 3 is another schematic structural diagram of the anti-lost device based on an electronic ink screen according to an embodiment of the present disclosure.
Figure 4:
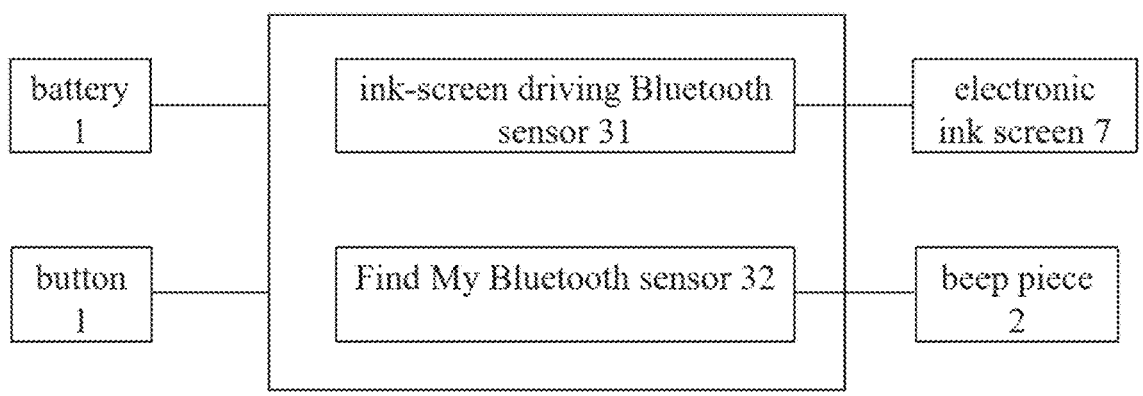
FIG. 4 is a schematic structural diagram of a circuit board of the anti-lost device based on an electronic ink screen according to an embodiment of the present disclosure.

In one embodiment, as shown in FIGS. 1 to 4, the structure diagrams of the anti-lost device based on the electronic ink screen of the embodiments of the present disclosure. The anti-lost device based on the electronic ink screen based on the electronic ink screen includes a housing 9, a battery 1, a beep piece 2, a circuit board 3, a button 4 and an electronic ink screen 7. The housing 9 includes a housing frame 6, a screen cover 8 and a housing rear cover 5. The housing frame 6 is connected with the screen cover 8 and the housing rear cover 5, and the screen cover 8 covers the electronic ink screen 7 The button 4 is located on the housing rear cover 5.

The ink screen described in the present disclosure is essentially an electronic ink screen, which may display a changed image like a conventional electronic screen. The electronic ink screen is also referred to as an electronic paper display technology, the structure of the paper is composed of two substrates, the paper is coated with electronic ink composed of countless tiny transparent particles, the particles are formed by sealing a plurality of black and white particles with positive and negative electricity in the internal liquid micro capsules, charged particles of different colors can move in different directions due to different applied electric fields, and a black or white effect is presented on the surface of the display screen. In this way, the surface of the "electronic paper" can display the black and white patterns and characters of the printing object, which appear very similar to the paper, and there is no reflection phenomenon of the traditional liquid crystal display in the sunlight. At the same time, only the pixel color changes (for example, from black to white) to consume power, and the picture on the display screen can still be reserved after the power supply is turned off, so that it is very power-saving. A method of displaying an image on an electronic ink screen can be referred to U.S. patent Ser. No. 17/532,470, color image processing method and device, electronic ink screen, and storage medium.

The circuit board 3 includes an electronic ink screen driving Bluetooth sensor 31 and a find my Bluetooth sensor 32. The beep piece 2, the electronic ink screen 7 and the button 4 are connected to the circuit board 3. The electronic ink screen 7 displays a preset pattern or a preset text when the anti-lost device is in a dormant state.

When the button 4 is pressed once, the electronic ink screen driving Bluetooth sensor 31 receives a to be changed pattern or a to be changed text from the APP of the mobile phone, and transmits the to be changed pattern or a to be changed text to the electronic ink screen 7 for display.

When the anti-lost device based on the electronic ink screen is lost, the app of the mobile phone sends a lost signal to the find my Bluetooth sensor 32, and the find my Bluetooth sensor 32 controls the buzz piece 2 to emit a sound alarm, and the find my Bluetooth sensor 32 simultaneously sends the location information to the app of the mobile phone.

When someone picks up the anti-lost device based on the electronic ink screen, when the key is pressed several times, such as 3 times, the electronic ink screen driving Bluetooth sensor 31 controls the electronic ink screen 7 to display the user's preset contact information, such as name, telephone, social account or email, or displays a QR code generated by the user's preset contact information.

The battery 1 is connected to the circuit board 3 to power the multifunctional anti-lost device based on the electronic ink screen. Battery 1 can use a button battery.

The anti-lost device based on the electronic ink screen has the advantages of low power consumption, multi-function display and convenient operation, and can be widely used in multiple scenarios such as anti-lost equipment, key chain, pet card, wallet and on, and has a good market prospect.

The specific structure of the follow focus controller may refer to the foregoing embodiments. The follow focus system adopts all the technical solutions of the foregoing embodiments, so it at least has all the technical effects brought by the technical solutions of the foregoing embodiments, which is not detailed herein.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. An anti-lost device based on an electronic ink screen, wherein the anti-lost device based on the electronic ink screen comprises a button, a circuit board and an electronic ink screen; the button and the electronic ink screen are connected to the circuit board; the circuit board includes an ink-screen driving Bluetooth sensor and a find my Bluetooth sensor; when the anti-lost device based on the electronic ink screen is lost, a computer application program (APP) of a mobile phone sends a lost signal to the circuit board, the find my Bluetooth sensor sends a location information to the APP;

and in lost case: after being picked up by other people, press the button to wake up the sensor, and then short press the button for several times continuously, and the anti-lost device based on the electronic ink screen will display the user's preset contact information, or display the QR code generated by the user's preset contact information.

2. The anti-lost device based on the electronic ink screen according to claim 1, wherein the anti-lost device based on the electronic ink screen further comprises a beep piece connected to the circuit board, and the find my Bluetooth sensor controls the beep piece to emit an audible alarm when receiving a lost signal.

3. The anti-lost device based on the electronic ink screen according to claim 1, wherein the anti-lost device based on the electronic ink screen further comprises a housing;

the housing comprises a housing frame, a screen cover and a housing rear cover, and the housing frame is connected with the screen cover and the housing rear cover.

4. The anti-lost device based on the electronic ink screen according to claim 3, wherein the screen cover is covered on the electronic ink screen, and the electronic ink screen driving Bluetooth sensor controls the electronic ink screen to display a preset pattern or a preset text when the anti-lost device is dormant.

5. The anti-lost device based on the electronic ink screen according to claim 3, wherein the button is located on the housing rear cover, and when the key is pressed once, the electronic ink screen driving Bluetooth sensor receives a to be changed pattern or a to be changed text from the APP of the mobile phone, and transmits the to be changed pattern or the to be changed text to the electronic ink screen for display.

6. The anti-lost device based on the electronic ink screen according to claim 1, wherein the anti-lost device based on the electronic ink screen further comprises a battery;

the battery is connected to the circuit board, and the battery is configured to supply powers to the anti-lost device based on the electronic ink screen.

7. The anti-lost device based on the electronic ink screen according to claim 6, wherein the battery is a button battery.

* * * * *